United States Patent

Wu

Patent Number: 5,258,088
Date of Patent: Nov. 2, 1993

[54] GOLF GRIP ASSEMBLY PROCESS

[76] Inventor: Yun-Lin Wu, No. 69, Chou Chung Rd., Chu Tien Hsiagn, Ping Tung Hsien, Taiwan

[21] Appl. No.: 801,354

[22] Filed: Dec. 2, 1991

[51] Int. Cl.$^5$ .................. B29C 63/18; B29C 63/48
[52] U.S. Cl. .................. 156/294; 156/314; 156/335; 273/81 R
[58] Field of Search ........... 156/294, 335, 284, 307.7, 156/308.6, 310, 314; 273/81 R, 81.5, 67 DB, 75, 81 D; 528/165

[56] References Cited

U.S. PATENT DOCUMENTS 2,478,943  8/1949  Rhodes ............... 156/335
2,593,926  4/1952  Simons ............... 528/165

FOREIGN PATENT DOCUMENTS 34115  10/1971  Japan .................. 528/165

OTHER PUBLICATIONS

Gould, *Phenolic Resins*, 1959, pp. 89–106.
Golf Digest, Apr. 1976, p. 137.

*Primary Examiner*—Michael W. Ball
*Assistant Examiner*—Steven D. Maki
*Attorney, Agent, or Firm*—Varndell Legal Group

[57] ABSTRACT

A golf grip assembly process which includes coating a sleeve with a layer of soluble phenol-acetaldehyde resin over the inner surface thereof, and spraying a solvent over the layer of soluble phenol-acetaldehyde resin with before the insertion of a rod for the grip. The soluble phenol-acetaldehyde resin is dissolved by the solvent into a glue to fixedly secure the rod inside the sleeve, after the insertion of the rod into the sleeve and after the setting of the glue, so that the rod and the sleeve are incorporated into a unitary golf grip assembly.

2 Claims, 3 Drawing Sheets

GOLF GRIP ASSEMBLY PROCESS

BACKGROUND OF THE INVENTION

The present invention relates to a golf grip assembly process which is to coat a soluble phenol-acetaldehyde resin and spray a solvent over the resin before the insertion of a rod into the sleeve so that the rod can be easily inserted into the sleeve and incorporated therewith into a golf grip after drying.

FIGS. 1 and 2 illustrate two different golf grip assembly processes according to the prior art. In the assembly process of FIG. 1, a double-sided adhesive tape is wound round the rod by labor or machine. The outer stripping layer of the double-sided adhesive tape is removed from the rod and coated with a solvent, and then the sleeve is sleeved onto the rod forming into a golf grip. This assembly process is complicated and relatively expensive to finish. During the insertion of the rod into the sleeve, the adhesive tape may be curled up, causing an uneven outer surface on the golf grip (see FIG. 3). Further, replacing the golf grip is also complicated to perform.

In the assembly process of FIG. 2, an adhesive glue is squeezed into the sleeve, the rod is coated with a layer of solvent, and then the rod is inserted into the sleeve. Because the squeezing of the adhesive glue into the sleeve can not uniformly distribute the adhesive glue over the inner surface of the sleeve, less binding force is produced to secure the sleeve to the rod. When the rod is inserted into the sleeve, the adhesive glue may be partly squeezed out of the sleeve through a vent hole thereon to contaminate the outer surface of the sleeve.

SUMMARY OF THE INVENTION

The present invention has been accomplished to eliminate the aforesaid disadvantages and problems. It is therefore an object of the present invention to provide a golf grip assembly process which is easy to complete. It is another object of the present invention to provide a golf grip assembly process which requires less labor to complete. It is still another object of the present invention to provide a golf grip assembly process which provides constant quality.

According to the present invention, the golf grip assembly process is to coat the sleeve with a layer of soluble phenol-acetaldehyde resin and spraying a solvent over the resin before the insertion of the rod therein. The phenol-acetaldehyde resin is dissolved by the solvent into a glue to facilitate the insertion of the rod into the sleeve. After a 4-hour air drying process, the glue is set to fixedly secure the rod inside the sleeve, and therefore, the sleeve and the rod are formed into a golf grip assembly.

DETAILED DESCRIPTION OF THE PREFERRED EMBODIMENT

Figure 2:
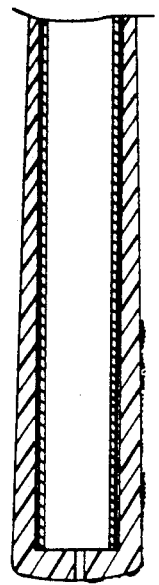
FIG. 2 is a sectional view of a golf grip as constructed according to another prior art golf grip assembly process.
Figure 3:
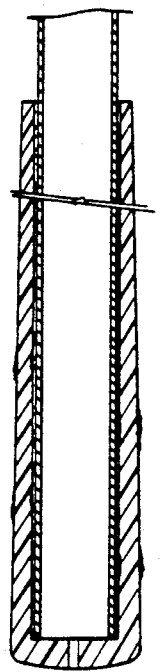
FIG. 3 is a sectional view of a golf grip as constructed according to the prior art golf grip assembly process of FIG. 1.
Figure 1:
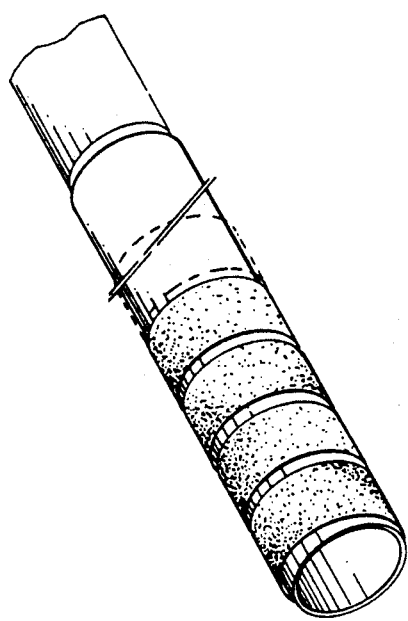
FIG. 1 illustrates that the rod is wound with a double-sided adhesive tape according to a prior art golf grip assembly process.
Figure 4:
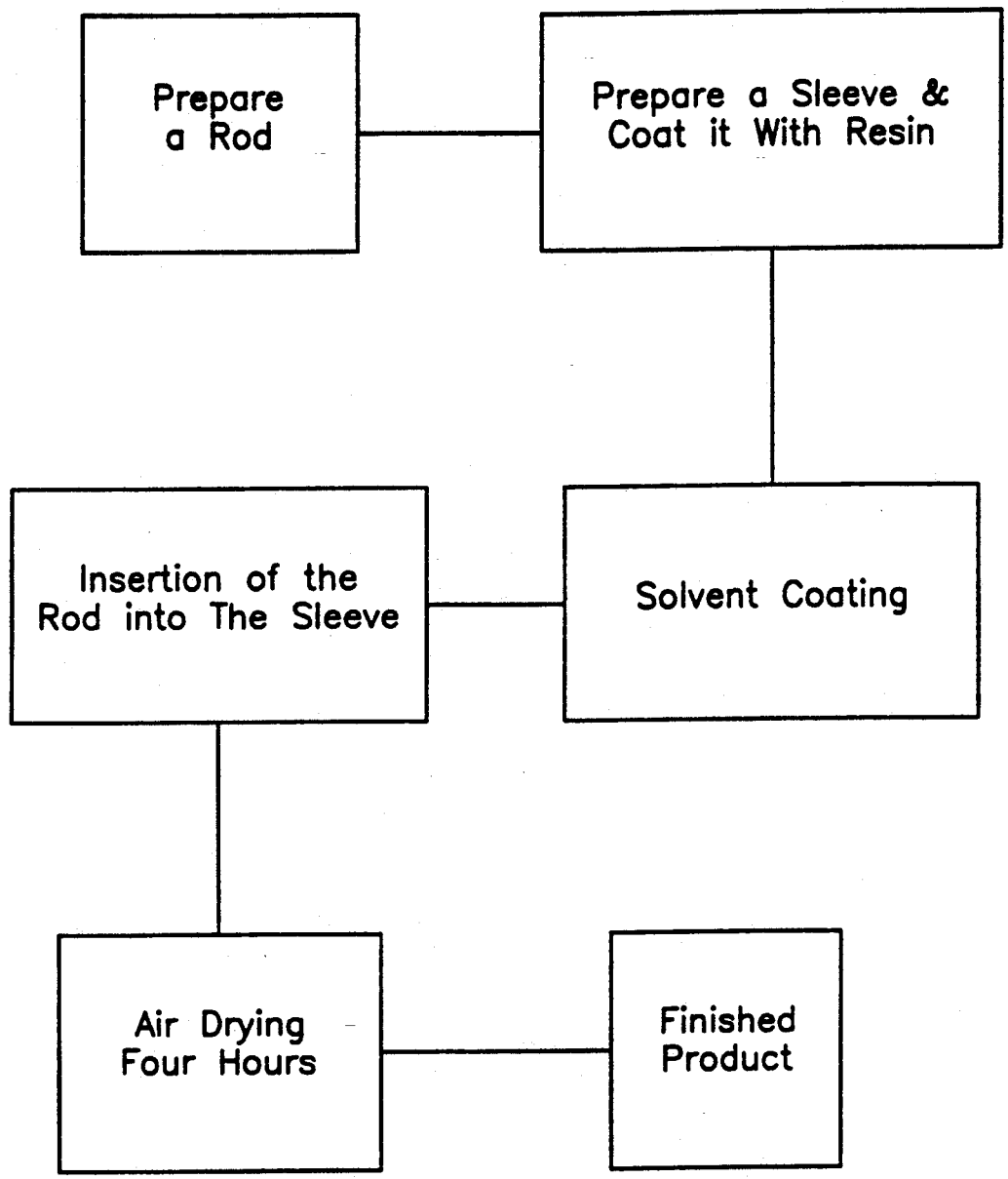
FIG. 4 is a flow chart of the present invention.
Figure 6:
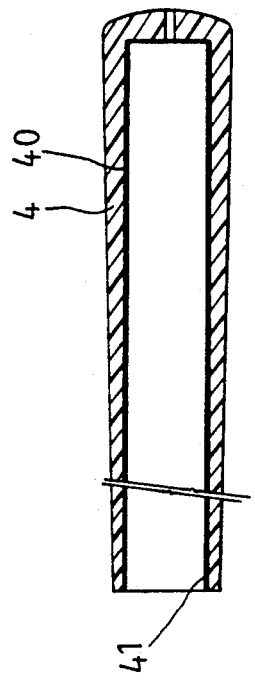
FIG. 6 is a sectional view of a sleeve according to the present invention.
Figure 7:
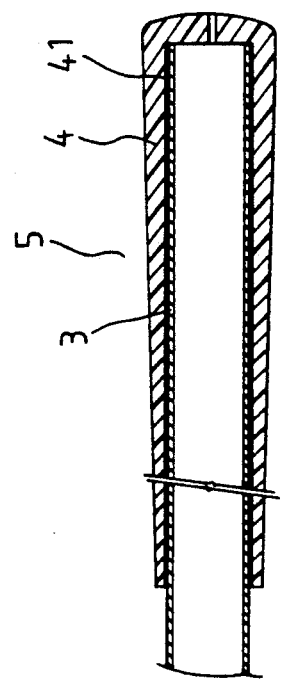
FIG. 7 is a sectional view of a golf grip according to the present invention.
Figure 5:
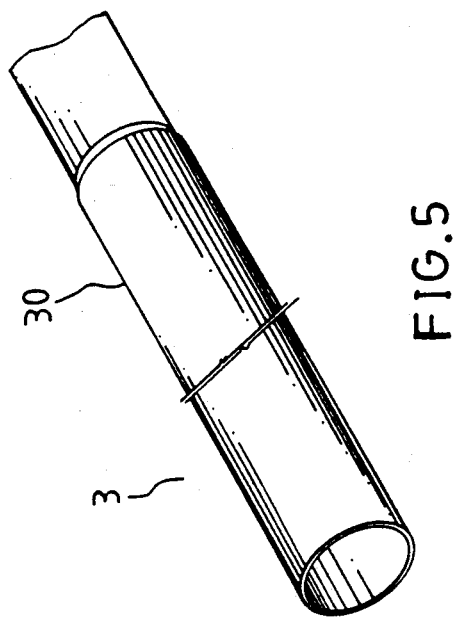
FIG. 5 is a perspective view of a rod according to the present invention.

Referring to FIGS. 4, 5, 6 and 7, a golf grip assembly process according to the present invention comprises the following procedures in proper order:

1. Providing a rod 3 for the golf grip assembly (see FIG. 5);

2. Providing a sleeve 4 for the golf grip assembly and coating the inner surface 40 of the sleeve 4 with a layer of soluble phenol-acetaldehyde resin 41 (see FIG. 6);

3. Spraying a solvent over the layer of soluble phenol-acetaldehyde resin 41 in the sleeve 4 as well as the outer surface 30 of the rod 3 before inserting the rod 3 into the sleeve 4;

4. Inserting the rod 3 into the sleeve 4 immediately after the coating of solvent, causing the phenol-acetaldehyde resin 41 inside the sleeve 4 to be dissolved into a glue; and 5. Setting the glue by drying in the air for about four hours after the insertion of the rod 3 into the sleeve 4, so as to fixedly secure the rod 3 and the sleeve 4 into a unitary golf grip assembly (see FIG. 7).

I claim:

1. A method for making a golf grip assembly comprising the ordered steps of:
    a first step of providing a rod and a sleeve;
    a second step of coating an inner surface of said sleeve with a layer of soluble phenol-acetaldehyde resin;
    a third step of spraying a layer of solvent directly on an outer surface of said rod and on said layer of soluble phenol-acetaldehyde resin;
    a fourth step of inserting said rod into said sleeve immediately after said third step, said solvent dissolving said phenol-acetaldehyde resin into a glue; and
    a fifth step of setting said glue by air drying for about four hours to fixedly secure said rod to said sleeve and form a unitary golf grip assembly.

2. A method for making a golf grip assembly consisting the ordered steps of:
    a first step of providing a rod and a sleeve;
    a second step of coating an inner surface of said sleeve with a layer of soluble phenol-acetaldehyde resin;
    a third step of spraying a layer of solvent directly on an outer surface of said rod and on said layer of soluble phenol-acetaldehyde resin;
    a fourth step of inserting said rod into said sleeve immediately after said third step, said solvent dissolving said phenol-acetaldehyde resin into a glue; and
    a fifth step of setting said glue by air drying for about four hours to fixedly secure said rod to said sleeve and form a unitary golf grip assembly.

* * * * *